May 18, 1943.  W. L. COOLEY  2,319,212

PHOTO-ELECTRIC CONTROL DEVICE

Filed Jan. 18, 1941  2 Sheets-Sheet 1

INVENTOR.
WILLIAM L. COOLEY
BY George B. White
ATTORNEY.

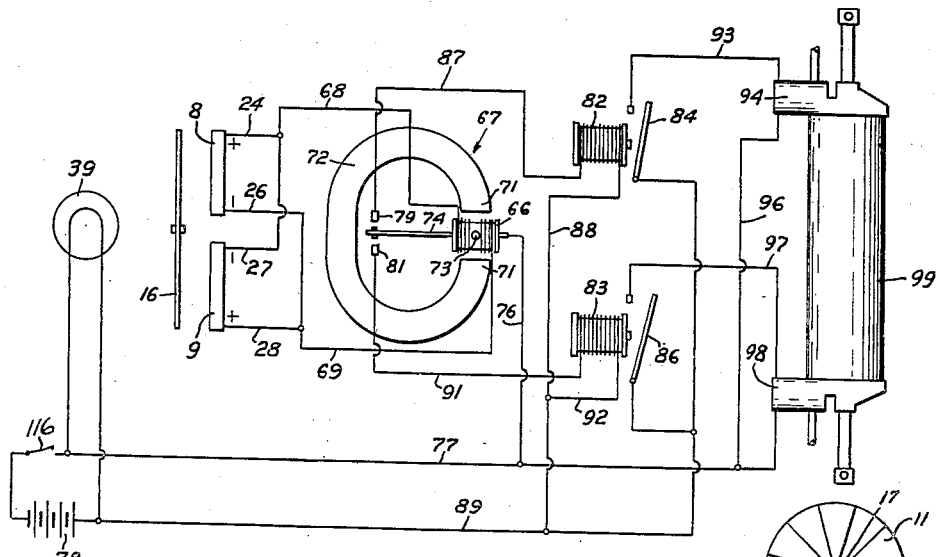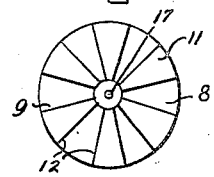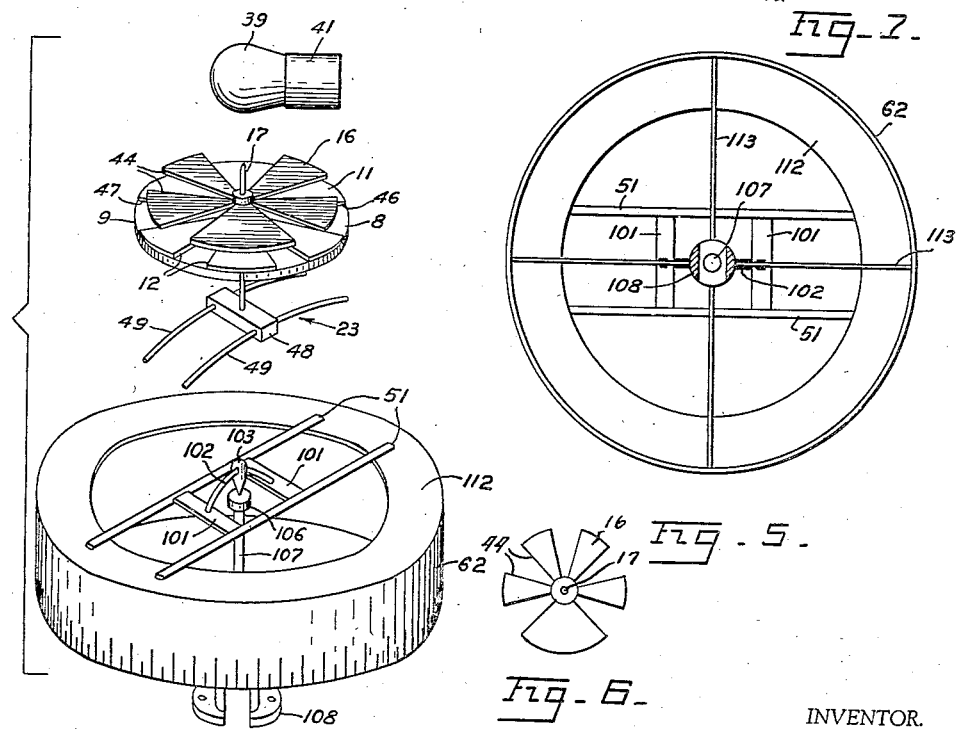

Patented May 18, 1943

2,319,212

UNITED STATES PATENT OFFICE 2,319,212

PHOTOELECTRIC CONTROL DEVICE

William L. Cooley, San Carlos, Calif., assignor to Archie A. Baldocchi, San Francisco, Calif.

Application January 18, 1941, Serial No. 375,086

6 Claims. (Cl. 33—204)

This invention relates to a photo-electric control device.

An object of this invention is to provide a flexible control unit which quickly reacts to any change of attitude and which regulates gradually in proportion with the need of control.

Another object of this invention is to provide a photo-electric control unit which can be readily placed as a unit into an instrument and wherein the position of the photo-sensitive elements and the light admission controls are preadjusted and maintained so that the movable light control elements move with minimum drag or friction.

Another object of this invention is to provide a light sensitive control unit which can be used adjacent to but outside of the actual fluid or magnet compartment of a magnetic compass, and in which the light controls are moved with the relative movement of the compass magnet with minimum drag upon the compass or upon the light control; the unit being readily adjustable to selected directional positions relatively to the initial position of the compass.

Another object of this invention is to provide a light sensitive direction control or steering device for dirigible crafts, the controller of which is responsive to course deviations of the craft, and which can be readily used for controlling the steering elements of the craft; said device being also adapted for remote control or indication of other related instruments or the like.

Other objects of this invention together with the foregoing will be set forth in the following description of the preferred embodiments of my invention, but it is to be understood that I do not limit myself to the embodiments disclosed in said description and the drawings as I may adopt variations of my preferred forms within the scope of my invention.

With the foregoing and other objects in view, which will be made more manifest in the following detailed description, reference is had to the accompanying drawings for the illustrative embodiment of the invention, wherein:

Fig. 3 is a wiring diagram of the instrument and its connection to the moving mechanism of the controls.

Fig. 4 is a somewhat diagrammatic perspective view of the parts of the photo-electric control unit;

Fig. 5 is a bottom plan view of the magnetic compass card, showing the arrangement of its dampeners.

Fig. 6 is a plan view of the shutter in applicant's device, and

Fig. 7 is a plan view of the shield on the photoelectric cells of applicant's device.

Figure 1:
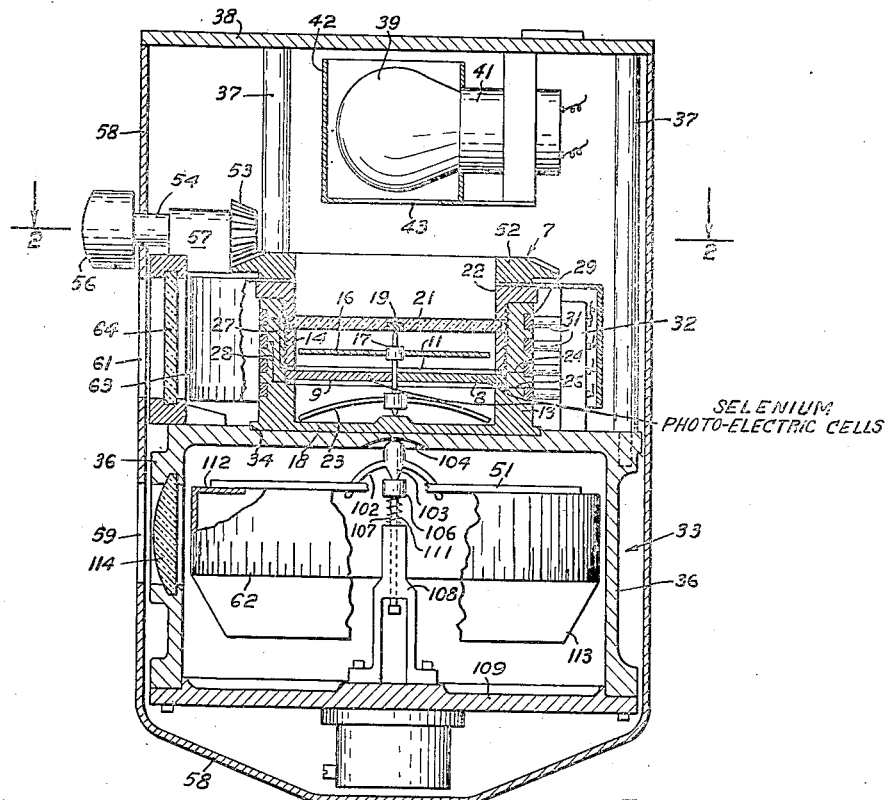
Fig. 1 is a sectional view of an instrument constructed in accordance with my invention.

The photo-electric control unit is denoted herein in its entirety by the numeral 7. This control unit 7 includes a pair of photo-electric cells 8 and 9 which are preferably made by cutting a circular disk of the light sensitive material into two semicircular sections. The semicircular sections are disposed in the same plane but their parallel diametrical edges are spaced from each other. A shield 11 is held stationary upon the top surfaces of the cells 8 and 9 so as to cover both cells. A plurality of radial slits 12 are provided in the shield 11 so as to leave certain portions of the respective cells 8 and 9 exposed. The cells 8 and 9 and the shield 11 are held in fixed relation to each other in a casing 13 by means of a threadedly secured retaining ring 14.

It is to be noted that the radial slits 12 flare toward the outer circumference of the respective cells 8 and 9 and are substantially symmetrically arranged with respect to diametrical parallel edges of the semicircular cells 8 and 9. A relatively movable shutter 16 is spaced above the shield 11 and is held in position by a spindle 17 which latter is extended through the center of the spacing between the photo-cells 8 and 9 and is suitably journaled at its lower end in the bottom 18 of the casing 13. The upper end of the spindle 17 is suitably journalled in a bearing 19 in a transparent cover 21 which latter is held in place on the top of the ring 14 by means of a threaded bushing 22. Beneath the photo-electric cells 8 and 9 there is a space provided and a light magnetic needle 23 is positioned therein between the cells and the bottom 18 of the casing 13. The magnetic needle 23 is supported on the spindle 17 so that the relative angular displacement between the cells and the magnetic needle 23 will cause identical angular displacement of the shutter 16 relatively to the fixed shield 11. This magnetic needle 23 is preferably made very light so as to respond to magnetic forces without any substantial drag. This magnetic needle 23 will be hereinafter referred to as a secondary magnetic needle. The cells 8 and 9 are connected to an electric circuit respectively by wires 24, 26, 27 and 28, and through suitable conductor rings 29 and brushes 31 which latter are supported on suitable stationary holders 32. This allows the turning of the unit 7 around its axis relatively to the instrument in which it is used, yet maintaining constant contact with the electric circuit of the instrument.

This entire unit 7 is placed into the instrument with which it is to be used. In the herein illustration the unit 7 is used in connection with a magnetic compass 33 so that the magnetic needle 23 functions as a secondary magnet outside of the compass 33 yet it is operated by the relative deviation of the magnet of the compass 33 with respect to an initial course. The unit 7 is rotatably held in an annular recess 34 on the top of the casing 36 of the compass 33 so that the spindle 17 is coaxial with the axis of the compass 33. The magnetic compass 33 is supported on bars 37 extended from a base 38, so as to space the compass 33 from the base 38. The control unit 7 is disposed in this space between the compass 33 and the base 38. The source of light for acting upon the cells 8 and 9 is provided herein by an electric light 39 held in a socket 41 on the base 38 so that the light 39 is in axial alignment with the center of the control unit 7. A projector shield 42 surrounds the light 39 so that the light rays are projected through a limited opening 43 centered with the axis of the spindle 17 of the control unit 7.

Figure 2:
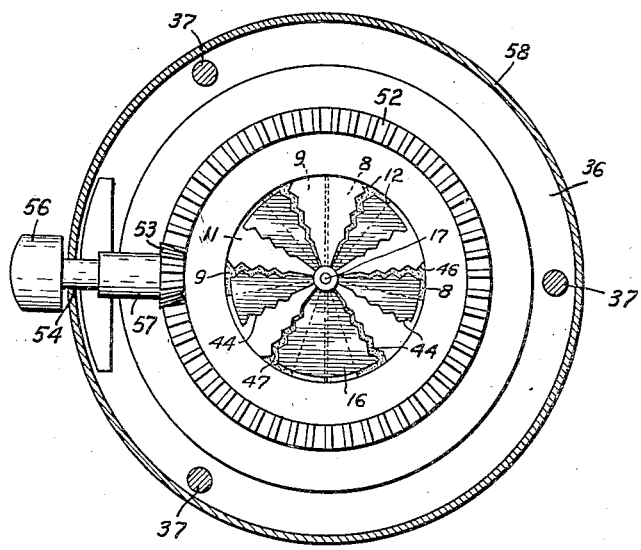
Fig. 2 is a sectional plan view of the instrument, the section being taken on the lines 2—2 of Fig. 1.

The shutter 16 of the control unit 7 is between the light 39 and the fixed shield 11. This shutter is provided with openings so arranged that the openings normally are out of alignment with the slits 12 of the fixed shield 11 and therefore cover the portions of the cells 8 and 9 which would be otherwise exposed through the shield 11. The openings of the shutter 16 are so arranged that upon deviation in one direction the slits 12 of the shield 11 over one cell are uncovered, and upon deviation in the opposite direction the slits 12 on the other cell are exposed, in proportion with the degree of deviation. In the herein form the openings of the shutter 16 are made in the form of radial flaring shutter slits 44. The shutter may be proportioned as in the herein illustration so that in its initial or neutral position all the shield slits 12 are partially exposed and the cells 8 and 9 are kept in a balanced slightly energized state. This is accomplished by offsetting the shutter slits 44 relatively to the respective shield slits 12 so that one radial edge of each shutter slit 44 is slightly offset to one side of the adjacent radial edge of the corresponding shield slit 12, leaving a radial segment shaped area exposed to light. The offsetting is opposite in direction on the opposite sides of the diametrical center spacing between the cells 8 and 9. The shield slits 12 on the cell 8 are initially exposed at the leading edges 46 thereof in clockwise direction viewing Fig. 2. The shield slits 12 on the other cell 9 are initially exposed at their trailing edges 47 thereof in clockwise direction viewing Fig. 2. In other words when the relative movement of the shutter 16 is clockwise with respect to the cells 8 and 9 the area of the exposed segment through the shield slits 12 over the photo-electric cell 8 will be increased, and the area of the exposed segment through the shield slits 12 over the other photo-electric cell 9 will be diminished and then entirely covered by the shutter 16, and vice versa. In this manner the control circuit in one direction is increased in action and is diminished and stopped in the opposite direction. The control unit 7 thus takes care of the return of the controls to initial position by its own positive action and regulation of the exposed areas of the respective cells 8 and 9. In order to enhance the action of the exposed area in use without increasing the diameter of the apparatus, the edges of the shield slits 12 and the shutter slits 44 can be serrated at parallel angles as shown in Fig. 2.

The most advantageous uses of this control unit 7 at present are in steering of aircraft and other vehicles, by compass or by direction finders, or the like, in showing compass indications at remote points, or other remote control indications or adjustments, according to deviation of an instrument acting upon the secondary magnet needle 23 of the unit. This needle 23 is constructed as shown in Fig. 4. A non-magnetic block 48 is secured on the spindle 17 and a pair of thin and bent magnetic wires 49 extend through the block 48 in a curved plane substantially parallel with the shutter 16. The wires 49 are arcuate so that the ends of each wire 49 point toward the respective ends of the primary magnet which actuates the control unit. In the herein illustration the ends of the magnetic wires 49 are attracted to point toward the opposite poles of the primary compass needles 51 in the magnetic compass 33. The secondary magnet should be relatively weak so as to permit the secondary magnet to move with the primary or compass magnet without interfering with the function of the compass. The magnetization of the secondary magnet is just sufficient to position the secondary magnet permanently with respect to the poles of the primary directional magnet.

The control unit 7 is adjustable relatively to the compass 33 so as to predetermine the direction of the course to be held. Adjustment is accomplished by means of a ring gear 52 on the top edge of the casing bushing 22 and a bevel gear 53 for turning the ring gear 52 and the unit 7 therewith in the compass casing recess 34. The bevel gear 53 is manipulated by means of a removable pin 54 and a knob 56, journalled in a suitable bracket 57. A housing 58 is slidable over the compass 33 and over the control unit 7 and it is secured to the base 38 so as to cover and protect the instrument. This housing 58 has sight windows 59 and 61 for the observation of the compass card 62 and the course card 63 respectively. The pin 54 is inserted in place into the pinion 53 through the wall of the housing 58. The course card 63 is held securely by its flange clamped between the top of the bushing 22 and the ring gear 52. A suitable magnifying glass 64 mounted on the top of the compass casing 33 and between the course card 63 and the sight window 61 facilitates the reading of the course card.

In the herein illustrative embodiment the photoelectric cells 8 and 9 are connected into the line of a solenoid 66 of a magnetic circuit-breaker 67. The positive line 24 of the photo-electric cell 8 and the negative line 27 of the other photo-electric cell 9 are connected parallel to a line 68 leading to one terminal of the solenoid. The negative line 26 of the cell 8 and the positive line 28 of the other cell 9 are connected parallel to another line 69 leading to the other terminal of the solenoid 66. Thus the solenoid 66 is normally inactive if the shutter is such as to completely cover the shield slits in the neutral position. When the shield slits are partially exposed in the neutral position then the solenoid is neutral because the flow through the respective photo-electric cells 8 and 9 balance each other. This solenoid is held in this neutral position also by a suitable spring action. The solenoid is located between the poles 71 of a horse shoe magnet 72 so as to rotate therebetween around its pivot 73 according to the direction of the flow of current through the solenoid 66. A conductor arm 74 is extended from the frame of the solenoid 66 and this conductor arm is connected by a line 76 and a main line 77 to a terminal of a source of electricity, such as the storage battery 78. Opposite the end of the conductor arm 74 are stationary conductor contacts 79 and 81. Whenever the action of one or the other photoelectric cell 8 or 9 increases so as to cause a flow in the respective direction the resulting flow of current in the solenoid 66 causes the solenoid 66 to turn around its pivot 73 between the magnetic poles 71 in one direction or in another according to the direction of flow through the solenoid 66, and accordingly close the circuit through the conductor arm 74 and one of the contacts 79 or 81, for connecting the current to the respective electric circuits.

The operating circuit is closed through power relays 82 and 83, which when energized respectively close circuit breakers 84 and 86 for closing the respective actuating circuits. A line 87 connects the contact 79 to the coil of the power relay 82 and a line 88 connects the other terminal of the power relay 82 to the other main supply line 89 to complete the energizing circuit for closing the circuit-breaker 84. The other relay 83 is connected by a line 91 to the sensitive relay contact 81, and by another line 92 to the main line 89 to complete a circuit for energizing its circuit for closing the circuit breaker 86. The circuit breaker 84 is in series between the main line 89 and a line 93 leading to a suitable electromagnetic mechanism at 94 for operating a servo motor or other steering mechanism in one direction. The other terminal of this electromagnetic mechanism is connected by a line 96 to the main line 77. The other circuit breaker 86 is in series between the main line 89 and a line 97 leading to electro-magnetic mechanism at 98 for operating the servo motor 99 or steering mechanism in the opposite direction. The other terminal of this second electromagnetic mechanism is connected by a line to the main line 77.

The electric light 39 is connected in parallel to the same source of electricity, or battery 78 as the power relays 82 and 83. Whenever either relay is actuated it draws on the current on the line and weakens the light 39 thereby reducing the action of the photo-sensitive cells after minor corrections. Only when the deviation is great enough to increase the exposed cell area so as to increase the action of the cells beyond the quantity balanced by the weakening of light, is the corrective action continuous. This provides for an initial intermittent action within a smaller range of deviation, followed by a constant action when the deviation exceeds said minimum or initial range or degree. This action as well as a form of power applying mechanism is described in my co-pending application for attitude control and method Serial Number 322,554, filed March 6, 1940, in which I also describe the corrective action on the steering surfaces of an aircraft or vessel.

The magnetic compass 33 herein shown also has novel features which adapt it for use in connection with parallel bars of magnets 51 which are mounted on cross bars 101 of a yoke 102 holding a pointed bearing pin 103. The top of the bearing pin 103 is a rounded semisphere which is rotatably held in a dished seat 104 on the inside face of the top of the casing 34. The pointed end of the pin 103 rests on a suitably frictionless bearing support 106 which latter is formed on the top of a rod 107 reciprocably held in a bracket 108. This bracket 108 is supported on the bottom 109 of the compass casing 36. A coil spring 111 between the top of the bracket 108 and the bearing support 106 urges the latter upwardly and yieldably holds the bearing pin 103 and the yoke 102 in position and operates on a shock absorber. The compass card 62 is cylindrical and it has horizontal inwardly turned flanges 112 which are secured to the ends of the magnets 51. The top flange 112 also functions as a dampener of tilting movement of the compass magnets 51 in the compass chamber. The inclosure or chamber of the compass is filled with suitable fluid to dampen the movement of the card and of the magnet. In order to dampen oscillation of the compass magnet and to prevent over swinging, I provide a plurality of radial fins 113 extending inwardly of the compass card 62. Thus both the turning movement and the tilting of the compass magnet and card are dampened and excessive vibration is obviated. A magnifying glass window 114 is provided on the side of the compass housing 34 opposite the window 59 of the outer housing 58 whereby the compass card can be easily observed. The windows 59 and 61 and the respective magnifying windows 64 and 114 are in vertical alignment so that the compass course can be easily compared with the preset course.

In operation the control unit 7 is preset to the desired direction by turning the knob 56 until the selected direction appears on the course card opposite the window 61. The position of the course card 63 is so assembled that initially its indications are aligned with those of the compass card. In use the craft is headed into the selected direction and then the automatic control is set into operation by closing the electric circuit by a switch 116. Thereafter whenever a deviation occurs from this selected course the relative movement of the craft to the compass causes the shutter 16 to increase the exposure of one of the cells and simultaneously decrease the exposure and cover the other cell thereby actuating the sensitive relay and two way circuit breaker 67 which latter energizes one of the power relays 82 or 83 according to the direction of deviation from the preset course. The power relay closes one or the other of the circuit breakers 84 or 86 so as to actuate the servo motor or steering mechanism in one direction or the other for correcting the deviation. The operation of the relays and solenoids in the system draws down the current of the light and reduces the actuation of the exposed cell. Up to the degree of deviation where the exposed cell area generates a current in excess of the amount of reduction of the intensity of light by the drawing of the current by the operating circuits, the actuation is intermittent. This is because the weakening of the light reduces the exposure of the respective cell and the energizing of the solenoid 66 thereby breaks the circuit, all elements then returning to the initial position. This slight actuation is repeated intermittently until the craft is righted on its course. When the deviation exceeds this degree the reduction of current flow and of the intensity of light is less then the intensity of current created by the larger exposed area of the cell and therefore the circuits remain closed until the craft again approaches its preset course, and then the intermittent righting action continues until the craft is fully righted. This action prevents over control of the craft. The control unit can be readily replaced, it is entirely outside of the compass chamber, it does not interfere with the normal operation of the compass, it does not disturb the fluid condition in the compass, it operates with ease and without appreciable drag and is eminently adopted for its purposes.

I claim:

1. In a photo-electric control unit, photo-electric elements providing a plurality of surfaces to be exposed to light, means to project light rays to said surfaces, a shield partially covering the surfaces of the photo-electric elements so as to leave spaced areas of light and shadow over each of said photo-electric elements, a shutter between the said spaced areas of the photo-electric elements and said light rays, said shutter having light admitting portions corresponding to but offset relatively to the uncovered areas of the photo-electric elements so as to uncover the areas of one or another of the photo-electric elements partially or wholly according to the direction and change of degree of relative position between the shutter and the photo-electric elements, means to control the shutter position by a characteristic of an object to be controlled, and means to transmit the electric current from said photo-electric elements to a control circuit.

2. In a photo-electric unit, photo-electric elements, a shield covering said photo-electric elements so as to leave spaced areas of light and shadow over said photo-electric elements, a light, and a shutter between the light and said spaced areas of light of said elements, light admitting areas in the shutter corresponding to said areas of light of said photo-electric elements and being offset relatively to said areas of light so that one set of light admitting areas of the shutter is opposite the respective areas of light of one photo-electric element upon relative angular displacement of the shutter in one direction from an initial position and another set of light admitting shutter areas is opposite the respective areas of light of the other photo-electric element upon relative angular displacements of the shutter in the opposite direction from said initial position, the proportion of registry of said superimposed light admitting areas and areas of light being in accordance with the degree of said relative shutter displacement, in accordance with a characteristic of the object to be controlled, and means to connect said photo-electric elements to a control circuit.

3. In a compass controlled photo-electric control unit, in combination, a magnetic compass, a light outside of and spaced from the compass, a control unit, means to removably support the control unit between the compass and the light and outside of the compass, said control unit including light sensitive elements connected in a control electric circuit, means to selectively expose said sensitive elements to light, and means within the unit but actuated externally by the compass to operate said exposure means to expose to light one or the other light sensitive element according to the direction and extent of displacement relatively to the compass.

4. In a magnetic compass, the combination with a magnetic compass supported in fluid in a closed compass chamber, of a compass card comprising a substantially cylindrical compass card connected to the compass magnet, means to yieldably journal the compass magnet in the compass chamber, a plurality of substantially radial vanes extended from said card so as to dampen the circular oscillation of the compass magnet and card, and dampening surfaces on the compass card to dampen tilting movement of the compass magnet and the card.

5. In a compass-controlled photo-electric control unit, in combination, a magnetic compass, a light outside of and spaced from the compass, a removable control unit between the compass and the light and outside of the compass, said control unit including light sensitive elements connected in a control electric circuit, means to regulate the exposure of said sensitive elements to light, and means within the unit but actuated externally by the compass to operate said exposure regulating means to expose to light one or the other light sensitive element according to the direction and extent of displacement relatively to the compass, and means to adjustably retain said unit in place between the compass and the light.

6. In a compass-controlled photo-electric control unit, in combination, a magnetic compass, a light outside of and spaced from the compass, a removable control unit between the compass and the light and outside of the compass, said control unit including light sensitive elements connected in a control electric circuit, means to regulate the exposure of said sensitive elements to light, and means within the unit but actuated externally by the compass to operate said exposure regulating means to expose to light one or the other light sensitive element according to the direction and extent of displacement relatively to the compass, a base, said light being supported on the base, means to support the compass on the base spaced from said light, means to retain said control unit between the compass and the light, and a removable housing on the base to cover said light, said unit and said compass.

WILLIAM L. COOLEY.